United States Patent [19]

Tanimoto et al.

[11] Patent Number: 4,934,188

[45] Date of Patent: Jun. 19, 1990

[54] TEMPERATURE SENSING FLOW SENSOR

[75] Inventors: Kohji Tanimoto; Mikio Bessho, both of Amagasaki, Japan

[73] Assignee: Mitsubishi Denki Kabushiki Kaisha, Tokyo, Japan

[21] Appl. No.: 315,747

[22] Filed: Feb. 27, 1989

[30] Foreign Application Priority Data

Feb. 26, 1988 [JP] Japan .................................. 63-45153
Dec. 12, 1988 [JP] Japan ................................. 63-314230
Dec. 12, 1988 [JP] Japan ................................. 63-314231

[51] Int. Cl.$^5$ .............................................. G01F 1/68
[52] U.S. Cl. ................................ 73/204.14; 73/118.2; 73/204.15; 73/204.18
[58] Field of Search ............. 73/118.2, 204.14, 204.15, 73/204.18

[56] References Cited

U.S. PATENT DOCUMENTS

| | | | |
|---|---|---|---|
| 4,043,195 | 8/1977 | Hunting | 73/204.14 |
| 4,334,186 | 6/1982 | Sasayama et al. | 73/204.14 |
| 4,753,111 | 6/1988 | Caron et al. | 73/204.14 |
| 4,794,795 | 1/1989 | Djorup | 73/204.14 |

OTHER PUBLICATIONS

Sauer, Rudolf et al., Hot Wire Air Mass Meter-a New Air Flow Meter for Gasoline Fuel Injection Systems, Society of Automotive Engineers, Inc., No. 800468.

*Primary Examiner*—Herbert Goldstein
*Attorney, Agent, or Firm*—Sughrue, Mion, Zinn, Macpeak & Seas

[57] ABSTRACT

A temperature sensing type flow sensor including a control pulse generating circuit for generating a pulse signal having a time ratio which corresponds to the output from a bridge circuit which contains temperature sensing elements, an intermittent control circuit for controlling a time in which an current is conducted in accordance with the time ratio, and a smoothing circuit for making an noncontinuous output from the intermittent control circuit continuous as supplied to the bridge circuit. The responsiveness of this temperature sensing type flow sensor is improved, and the change of the temperature sensing type elements due to time elapse and power source loss can be reduced. Furthermore, a switching control type temperature sensing flow sensor exhibits the most suitable frequency response throughout a significantly wide frequency region.

3 Claims, 7 Drawing Sheets

TEMPERATURE SENSING FLOW SENSOR

BACKGROUND OF THE INVENTION

1. Field of the Invention

The present invention relates to a temperature sensing type flow sensor for measuring the amount of air taken in an engine.

2. Description of the Related Art

Conventional temperature sensing type flow sensors of an engine control digital output type have been disclosed in Japanese Patent Application Laid-Open Nos. 56-51619, 62-79316, and 62-55518. FIG. 1 schematically illustrates a circuit used in a digital signal output type temperature sensing flow sensor disclosed in Japanese Patent Application Laid-Open No. 62-55518 wherein the amount of air taken in an engine is measured.

Referring to FIG. 1, a temperature sensing element 2 for heating and a temperature sensing element 3 for detecting the temperature of air are provided in an intake pipe 1. The temperature sensing elements 2 and 3 each comprise a thin wire or a thin film resistor element made of, for example, platinum, tungsten or nickel whose resistance can be changed, and they are arranged to be positioned in contact with the air flow through the intake pipe 1. An Wheatstone bridge circuit is constituted by these temperature sensing elements 2 and 3 and fixed resistors 4 to 6. A heating electricity is supplied, via a transistor 25, to this bridge circuit. The output from the bridge circuit is connected to a comparator 20. An output signal from the comparator 20 is supplied when the temperature of the temperature sensing element 2 has been raised by the heating electricity to a level which is different by a predetermined degree from that of the temperature sensing element 3 for detecting the temperature of air. The output signal from this comparator 20 resets a flip-flop 21, and the output from this flip-flop 21 makes the switch element 23 close via a buffer 22. The voltage of the electricity to be supplied from the transistor 25 to the temperature sensing element 2 is controlled at a constant level with reference to the reference voltage power souree 26.

In this structure, the flip-flop 21 is set in response to a start pulse signal, and the flow of heating current is turned on so that the temperature sensing element 2 is heated. When the temperature of the temperature sensing element 2 has been raised to a level which is different by a predetermined degree from that of air, an output signal is generated by the comparator 20 so that the flip-flop 21 is reset and the switch element 23 is closed, causing the transistor 25 to be grounded. As a result, the heating current is stopped. The speed at which the temperature of the temperature sensing element 2 rises is arranged to be in inverse proportion to the air flow though the intake pipe 1. Therefore, the time taken from the start of the flow of heating current to the generation of the output signal supplied from the comparator 20 is caused to correspond to the flow of the intake air passing though the intake pipe 1. Therefore, by measuring the time period of the output pulse from the flip-flop 21, the amount of intake air can be measured.

The conventional digital signal output type temperature sensing type flow sensors are structured as described above in which the time taken for the difference between the temperature of the sensing elements 2 and that of 3 to become a predetermined level is measured. Therefore, only poor responsiveness can be realized with respect to that obtained with the fixed temperature method, and since the temperature of the temperature sensing element 2 can be rapidly changed, the resistance-temperature characteristics of the temperature sensing element 2 are changed in accordance with the elapse of time.

SUMMARY OF THE INVENTION

To overcome this problem, an object of the present invention is to provide a temperature sensing type flow sensor which exhibits an excellent responsiveness and reduced change in over time and which also exhibits a reduced loss of the electric power supplied thereto.

Another object of the present invention is to provide a switching control type temperature sensing flow sensor capable having a frequency response covering a significantly wide frequency region.

Still another object of the present invention is to provide a switching control type temperature sensing flow sensor with which the flow can be measured regardless of changes in the voltage of the power source and which is also capable of providing a digital output.

According to one aspect of the present invention, there is provided a temperature sensing type flow sensor which comprises:

temperature sensing elements disposed in intake air and having a resistance which changes with temperature; a bridge circuit composed of the temperature sensing elements and fixed resistors; a control pulse generating circuit for generating pulses having a time ratio which corresponds to the output from the bridge circuit; an intermittent control circuit disposed between an electric source and the bridge circuit and for controlling the time periods in which current is allowed to flow in accordance with the time ratio; and a smoothing circuit for making the noncontinuous output from the intermittent control circuit continuous as supplied to the bridge circuit.

According to another aspect of the present invention, there is provided a temperature sensing type flow sensor which comprises:

temperature sensing elements disposed in intake air and having a resistance which changes with temperature; a bridge circuit composed of the temperature sensing elements and fixed resistors; a differential amplifier circuit for amplifying the output from the bridge circuit and including a compensation circuit for compensating phase delay of the output; a control pulse generating circuit for generating pulses having a time ratio which corresponds to the output from the differential amplifier circuit; an intermittent control circuit disposed between an electric source and the bridge circuit for controlling the time periods during which current is allowed to flow in accordance with the time ratio; and a smoothing circuit for making the noncontinuous output from the intermittent control circuit continuous as supplied to the bridge circuit.

According to still another aspect of the present invention, there is provided a temperature sensing type flow sensor which comprises:

temperature sensing elements disposed in intake air and a resistance which changes with temperature; a bridge circuit composed of the temperature sensing elements and fixed resistors; a chopping wave generator for generating chopping waves; a comparator to which the voltage at the bridge circuit and the output from the chopping wave generator are input and for generating digital outputs having a time ratio which is a function of an intake air flow; a control pulse generating circuit to which the output from the chopping wave generator and the output from the bridge circuit are input, and for generating a pulse having a time ratio which corresponds to the output from the bridge circuit; an intermittent control circuit disposed between an electric source and the bridge circuit and for controlling time during which current is allowed to flow in accordance with the time ratio of the pulses generated in the control pulse generating circuit; and a smoothing circuit for making the noncontinuous output from the intermittent control circuit continuous as supplied to the bridge circuit.

DESCRIPTION OF THE PREFERRED EMBODIMENT

A temperature sensing type flow sensor according to an embodiment of the present invention will now be described with reference to the drawings.

Figure 1:
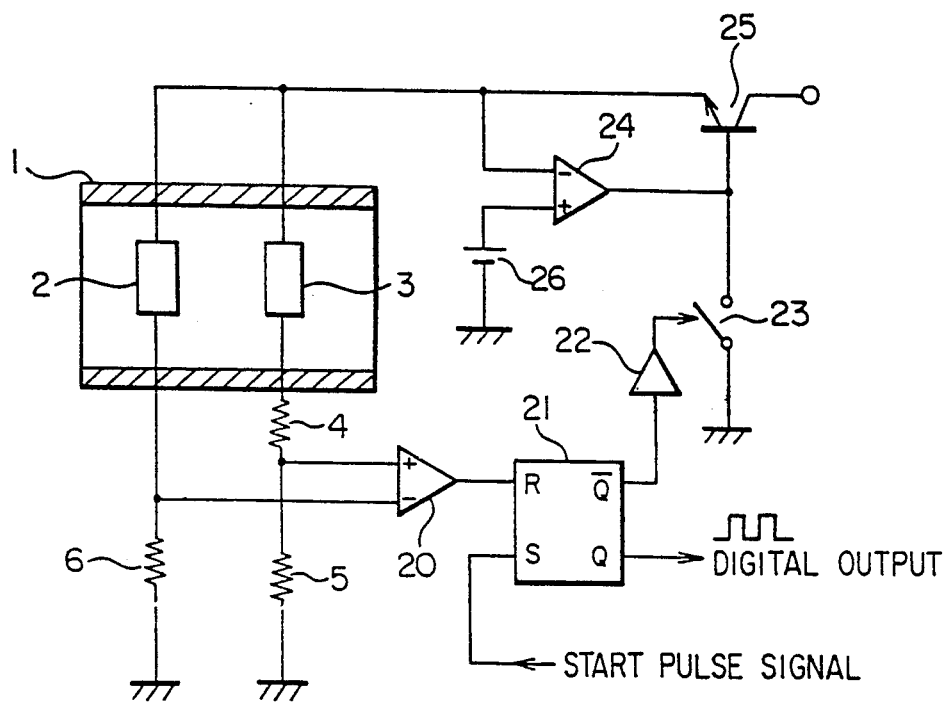
FIG. 1 schematically illustrates a circuit for use in a conventional temperature sensing type flow sensor.
Figure 2:
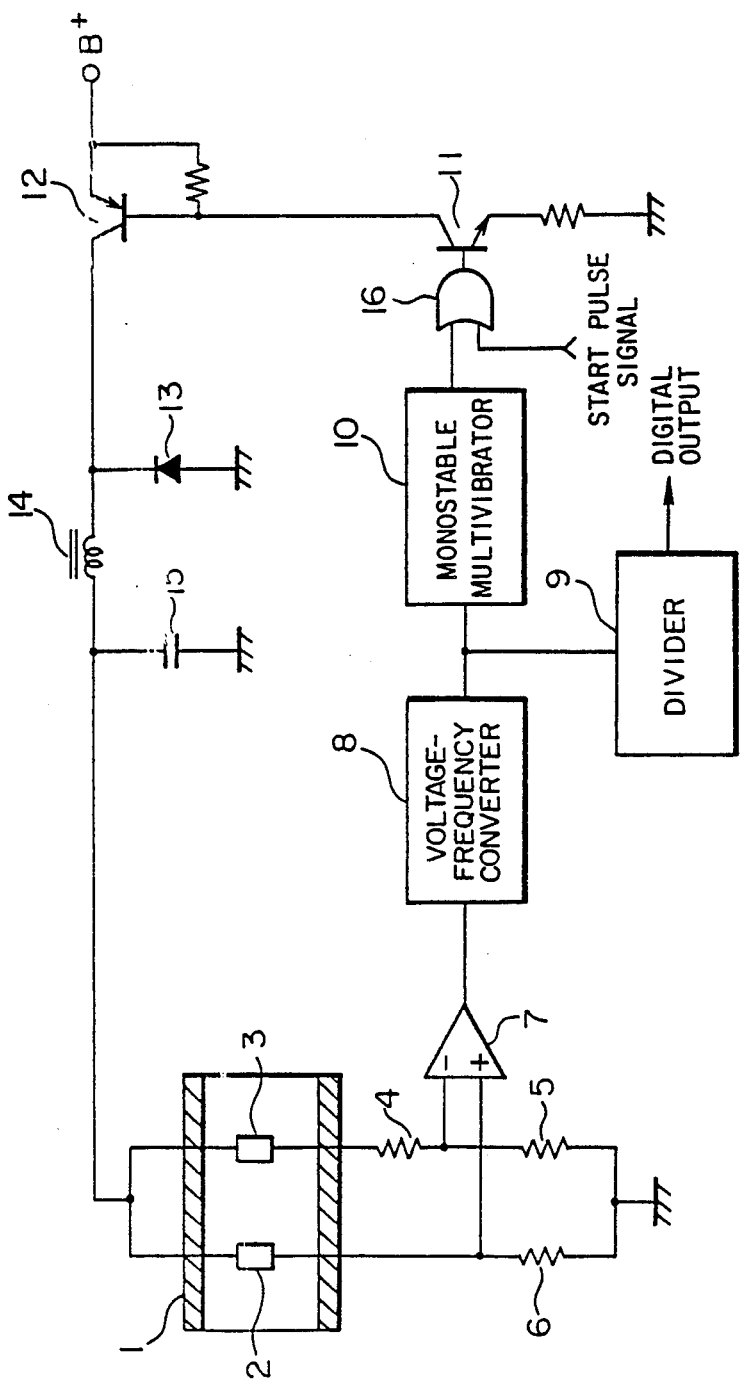
FIG. 2 schematically illustrates a circuit for use in a temperature sensing type flow sensor according to an embodiment of the present invention.

Referring to FIG. 2, a temperature sensing element for heating 2 and a temperature sensing element 3 for detecting the temperature of air are provided in the passage of an intake pipe 1. These temperature sensing elements 2 and 3 and fixed resistors 4 to 6 form a bridge circuit. The output form this bridge circuit is input to a differential amplifier 7, and the output from this differential amplifier 7 is input to a voltage-frequency converter 8 so that a pulse signal having a frequency in proportion to the output from the bridge circuit is output. This pulse signal is input to a monostable multivibrator 10, and is input to the base of a transistor 11, via an OR circuit 16. A control pulse generating circuit is formed by this voltage-frequency converter 8 and the monostable multivibrator 10. The transistor 11 intermittently controls a power transistor 12 which supplies current to the bridge. A smoothing circuit constituted by a diode 13, inductor 14 and condenser 15 is connected to the collector side of the power transistor 12 whereby the discontinuous waveform is made continuous. The output from this smoothing circuit is connected to the bridge circuit so that current is supplied to the bridge circuit. The pulse signal supplied from the voltage-frequency converter 8 is, by a divider 9, reduced to a frequency which can be preferably measured by a microcomputer.

Next, an operation of the above-described temperature sensing type flow sensor will be described. Assuming that the air flow in the intake pipe 1 has been increased, the noninverted input voltage of the differential amplifier 7 is raised, and the output voltage of the differential amplifier 7 is also raised. In accordance with this, the frequency of the output pulse signal from the voltage-to-frequency converter 8 is increased, and the time ratio of the output pulse from the monostable multivibrator 10 is increased. In this state, the transistor 11 is turned on when the output level from the monostable multivibrator 10 is at a high level, causing the transistor 12 to conduct. Therefore, when the time ratio of the output pulse from the monostable multivibrator 10 is increased, the time ratio of the collector voltage pulse of the power transistor 12 is also increased so that the output voltage of the smoothing circuit is raised. As a result, the heating current which passes through the temperature sensing element 2 is increased, and the temperature of the temperature sensing element 2 is kept constant.

Assuming that the voltage of the bridge circuit is $V_0$, and the emitter voltage of the power transistor 12 is $V_B$, $$V_0 = \frac{T_{ON}}{T_{ON} + T_{OFF}} V_B \quad (1)$$

wherein $T_{ON}$ and $T_{OFF}$ respectively represent time at which the power transistor 12 is turned on and the time at which the same is turned off, and $T_{ON}$ corresponds to the pulse width of the monostable multivibrator 10.

Voltage $V_0$ of the bridge circuit can be expressed by the following equation:

$$V_0 = I(R_H + R_6) \quad (2)$$

wherein I represents current which passes though the temperature sensing element 2, $R_H$ represents the resistance of the temperature sensing element 2, and $R_6$ represents resistance of the fixed resistor 6.

From equations (1) and (2), heating current I can be expressed by the following equation:

$$I = \frac{V_B}{R_H + R_6} \cdot \frac{T_{ON}}{T_{ON} + T_{OFF}} \quad (3)$$

On the other hand, the thermal equilibrium equation for the temperature sensing element 2 can be expressed by the following equation:

$$I^2 R_H = A + B\sqrt{Q} \quad (4)$$

wherein A and B represent constants, and Q represents the intake air flow.

The time ratio is deduced from equations (3) and (4) as follows:

$$T_{ON}f = \frac{T_{ON}}{T_{ON} + T_{OFF}} = \frac{R_H + R_6}{V_B} \sqrt{\frac{A + B\sqrt{Q}}{R_H}} \quad (5)$$

wherein, f represents the output frequency from the voltage-to-frequency converter 8. Since $R_H$ is constant and $T_{ON}$ is also constant when the bridge circuit is in an equilibrium state, the frequency f can be given by a biquadratic root of flow Q. Therefore, the flow Q in the intake pipe 1 can be obtained by measuring the digital output from the divider 9, which has been obtained by dividing the output pulse from the voltage-to-frequency converter 8.

In order to assuredly operate the sensor immediately after power has been supplied, a start pulse signal is input to the OR circuit 16. After the system has been started, the transistors 11 and 12 are operated by the pulse output from the monostable multivibrator 10.

Although the control pulse generating circuit is composed of the voltage-to-frequency converter 8 and the monostable multivibrator 10 in the above-described embodiment, it may comprise a pulse width converting circuit formed by a chopping wave circuit and a comparator. However, in this case, the flow detection signal comprises a pulse width as an alternative to the frequency.

According to the above-described temperature sensing type flow sensor, control is so performed that the temperature of the temperature sensing element is kept constant. Therefore, it is not necessary to wait until the temperature sensing element has heated up to a predetermined temperature. In addition, the thermal shock applied to the temperature sensing element can be reduced. Consequently, the responsiveness can be improved and the change of the temperature sensing element over time can be as well reduced. In addition, since the power source is intermittently controlled, the total power loss can be reduced with respect to the case of continuous power supply.

The thermal type flow sensor utilizes a phenomenon of heat transmission from a heating element comprising a temperature sensing resistor disposed in the passage for the intake air, wherein the detection circuit based on the constant temperature measuring method which exhibits an excellent responsiveness is generally employed. In the constant temperature measuring method, the bridge circuit and the differential amplifier thereof are arranged as to make the temperature of the heating element always higher than that of the intake air by a predetermined degree. Therefore, the power loss of the transistors for supplying a current to the bridge circuit is considerably large. To this end, an intermittent control method has been disclosed in which the transistors are duty-controlled as to reduce the power loss, and while a similar temperature measurement effect can be thereby obtained.

Figure 3:
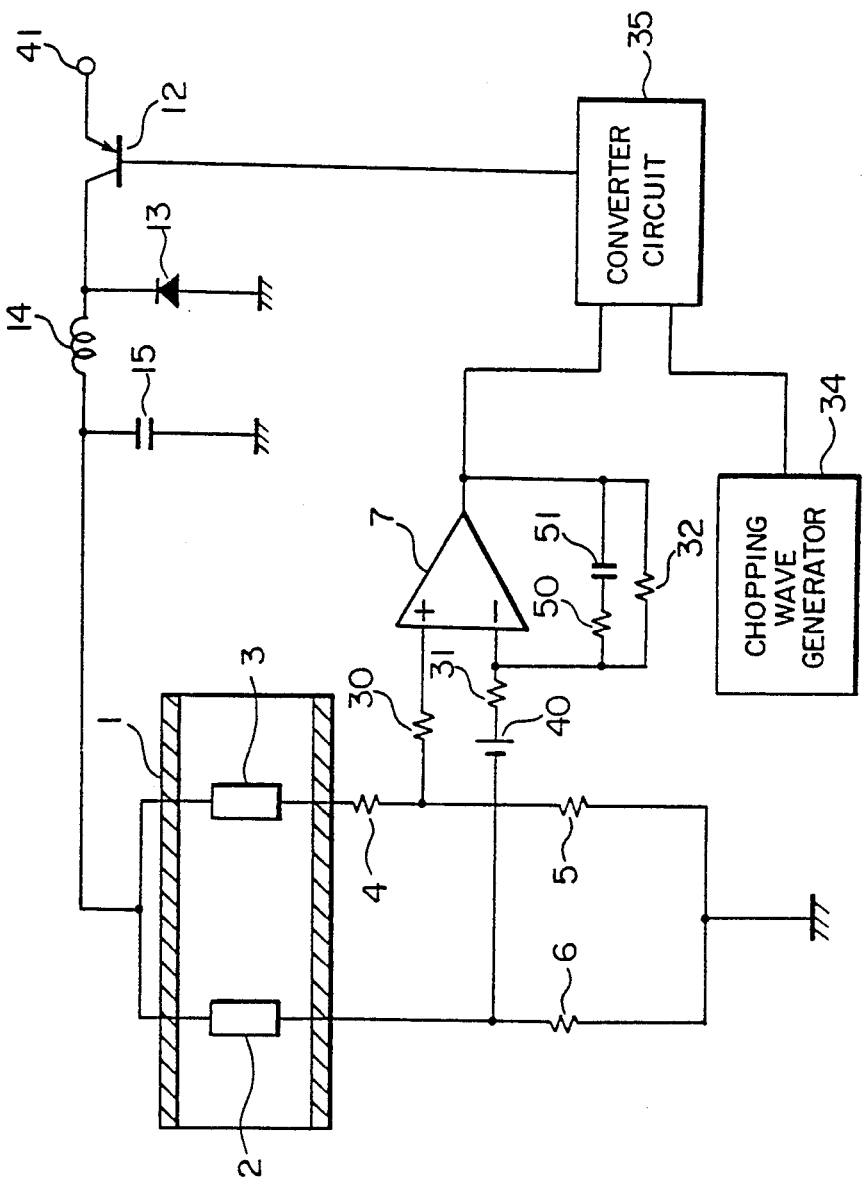
FIG. 3 schematically illustrates a temperature sensing type flow sensor according to another embodiment of the present invention.

Next, a schematic drawing of a circuit for use in a switching control temperature sensing type flow sensor based upon the intermittent control method according to another embodiment of the present invention is shown in FIG. 3. Referring to FIG. 3, the temperature sensing element 2 and the temperature sensing element 3 for detecting the temperature of the intake air are provided in the intake pipe 1. A Wheatstone bridge is composed of these temperature sensing elements 2 and 3 and the fixed resistors 4 to 6. The junction between the fixed resistor 6 and the temperature sensing element 2 and the junction between the fixed resistors 4 and 5 are input to the differential amplifier circuit so that the difference between the unbalance voltage of the bridge circuit and the voltage of the D.C. unbalance power source 40 which is the D.C. unbalalance voltage generating means is amplified. The differential amplifier circuit comprises fixed resistors 30 to 32 and the differential amplifier 7. The output voltage from this differential amplifier circuit is converted into a pulse signal by a pulse width converter circuit 35. A chopping wave generator 34 serves as a signal source for the pulse width conversion. The pulse signal is converted into a pulse signal having a time ratio in proportion to the output from the differential amplifier circuit in the pulse width converter circuit 35. This pulse signal causes the switching transistor 12 to be controlled between switch-on and switch-off. The waveform of the D.C. power source 41 which has been intermitted by the transistor 12 is made continuous by the smoothing circuit and the diode 13, the smoothing circuit comprising the inductor 14 and the condenser 15. As a result, a current is supplied to the bridge circuit. The constant temperature circuit can be thus structured by forming a feedback circuit which is arranged in such a manner that the resistances are determined so as to have the bridge circuit in balance when the temperature of the temperature sensing element 2 for heating is higher than that of the intake air by a predetermined degree.

In addition, a series circuit constituted by a resistor 50 and a condenser 51 is connected in parallel to the feedback resistor 32. The resistance of the resistor 50 is arranged to be smaller than that of the resistor 32. A phase-delay compensation circuit is composed of the resistors 32 and 50, and the condenser 51.

Next, an operation of the above-described temperature sensing type flow sensor will be described.

Assuming that the air flow in the intake pipe 1 has been increased, the temperature of the temperature sensing element 2 for heating is lowered, causing its resistance to be reduced. In accordance to this, the potential at the junction between the temperature sensing element 2 for heating and the fixed resistor 6 is lowered, and the output voltage from the differential amplifier 7 is increased. In addition, the time ratio of the digital output from the pulse width conversion circuit 35 is changed, and the time in which the voltage is kept at a high level is lengthened. Therefore, the time in which the transistor is turned on is lengthened and the heating current supplied to the bridge circuit is increased, this heating current being to be smoothed by the smoothing circuit. Consequently, the temperature of the temperature sensing element 2 for heating is prevented from being lowered. As a result, the temperature of the temperature sensing element 2 for heating can be kept constant.

In this state, time ratio D of the switching signal of the switching transistor 12 becomes:

$$D = \frac{I(R_h + R_6)}{V_{in}} \quad (6)$$

wherein I represents heating current, $V_{in}$ represents the voltage of the D.C. power source 41, $R_h$ represents resistance of the temperature sensing element 2 for heating, and $R_6$ represents the resistance of the fixed resistor 6.

On the other hand, the relationship between heating current I and flow Q when the constant temperature control is being performed becomes:

$$I = \sqrt{A + B\sqrt{Q}} \quad (7)$$

wherein A and B represent constants. Therefore, time ratio D becomes $$D = \frac{(Rh + R6) \cdot \sqrt{A + B\sqrt{Q}}}{V_{in}} \quad (8)$$

Since $R_h$ and $R_6$ are constant values, time ratio D is a function of Q provided that power source voltage $V_{in}$ is not changed. Therefore, flow Q can be obtained by measuring the time in which the control signal of the switching transistor 12 is switched on or the time in which the same is switched off. Furthermore, a benefit can be obtained that the interface with a microprocessor is not required since the output signal serving as the sensor is in the digital form.

Next, the effect of the D.C. unbalance power source 40 will be described. Considering this D.C. unbalance voltage, the resistance $R_h$ of the temperature sensing element 2 for heating can be given by the following equation (9):

$$Rh = \frac{(Rk + R4) R6}{R5} + \Delta Rh \quad (9)$$

wherein $R_k$ represents the resistance of the temperature sensing element 3 for detecting the temperature of the intake air, and $R_4$ and $R_5$ represent the resistance of the corresponding stationary resistors 4 and 5. As a result of the provision of the D.C. unbalance power source 40, $R_h$ becomes the resistance value greater, by $\Delta R_h$, than the value needed for balancing the bridge circuit. This $\Delta R_h$ becomes as follows provided that the voltage of the D.C. unbalance power source 40 is $\Delta E$:

$$Rh = \left(\Delta E - \frac{I(Rh + R6)}{A}\right)\left(1 + \frac{Rk + R4}{R5}\right) \times \frac{1}{T} \quad (10)$$

wherein A represents a direct current differential gain. This direct current differential gain A can be represented as $A = R_9/R_8$, wherein $R_8$ and $R_9$ represent the resistance of the corresponding resistors 31 and 32. As can be clearly seen from the above-described equation, the resistance of the temperature sensing element 2 for heating depends upon heating current I, that is, the resistance is changed in accordance with the flow, as a result of which, as the flow increases, $R_h$ becomes smaller. This change becomes larger as the differential gain becomes smaller. In order to realize an ideal constant temperature circuit, it is preferable for the D.C. differential gain to be as great as possible.

Figure 4:
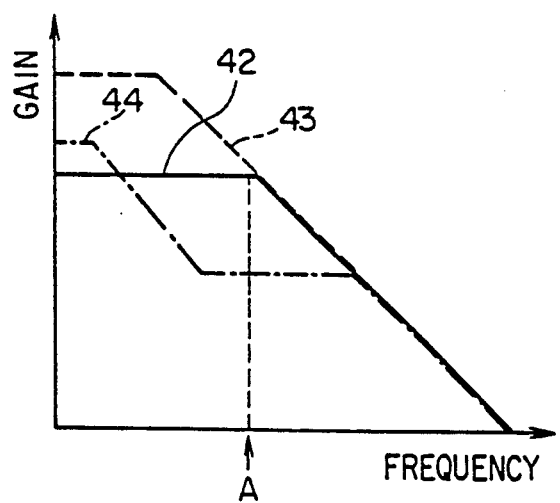
FIG. 4 is a diagram illustrating a frequency characteristic of a differential amplifier circuit of the flow sensor shown in FIG. 3.
Figure 5:
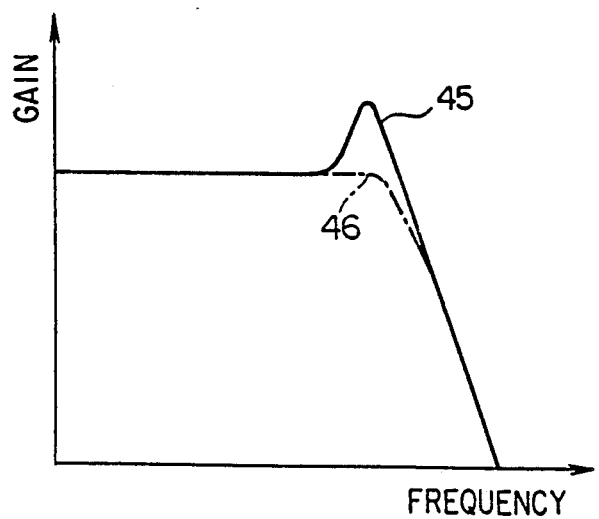
FIG. 5 is a diagram illustrating a frequency characteristic of the output from the flow sensor shown in FIG. 3.

FIG. 4 illustrates the frequency characteristics 42 of the differential amplifier circuit, wherein a flat frequency characteristic indicates the resonant frequency (shown as A) of the smoothing circuit. Reference numeral 43 represents the open loop characteristics of the differential amplifier 7. Reference numeral 45 shown in FIG. 5 represents the frequency characteristics of the sensor output, which corresponds to a small flow change when the average flow Q is constant.

A case where no phase delay compensation circuit as in FIG. 3 is provided will now be considered. Characteristics 45 shown in FIG. 5 has its peak value in the vicinity of the resonant frequency. This is caused due to the resonant frequency of the smoothing circuit, and due to the excessively large differential gain of the differential amplifier circuit at the resonant frequency whose phase delay exceeds 180 degrees. This peak increases in proportion to the increase in the average flow, and increases in accordance with the increase in the D.C. differential gain, causing the status to become unstable. Therefore, an ideal constant temperature circuit cannot be realized because the D.C. differential gain cannot be provided with a sufficiently great value. In addition, since a resonant frequency response is realized in proportion to the increase in the flow, the region of the flow capable of being measured becomes narrower, causing the maximum flow capable of being measured to be limited to substantially 50 g/sec. Since this flow is a third of the maximum quantity of air which can be taken in with a natural suction type 2000 cc engine, the overall flow region can not be covered.

On the other hand, when the phase delay compensation circuit is provided, the frequency characteristics of the AC differential gain of the differential amplifier circuit becomes frequency response characteristics as represented by the reference numeral 44 shown in FIG. 4, this characteristics displaying high D.C. differential gain but displaying low high-frequency gain. Therefore, the frequency response characteristics of the sensor with respect to the small flow change becomes as represented by reference numeral 46 shown in FIG. 5. Therefore, the frequency characteristics having the most suitable damping characteristics can be obtained by lowering the AC gain of the differential amplifier circuit.

As described above, the temperature sensing type flow sensor according to the present invention shown in FIG. 3 is arranged in such a manner that the phase delay compensation circuit which compensates the phase delay of the differential amplifier circuit is provided in this differential amplifier circuit which amplifies the output from the bridge circuit. Therefore, the differential amplifier circuit is arranged to compensate the phase delay so that the AC differential gain can be reduced with the direct current differential gain thereof maintained. The marginal gain at the resonant frequency at which the delay is rapidly delayed in the smoothing circuit is increased so that the frequency response can be adjusted to display slightly damped characteristics.

Figure 6:
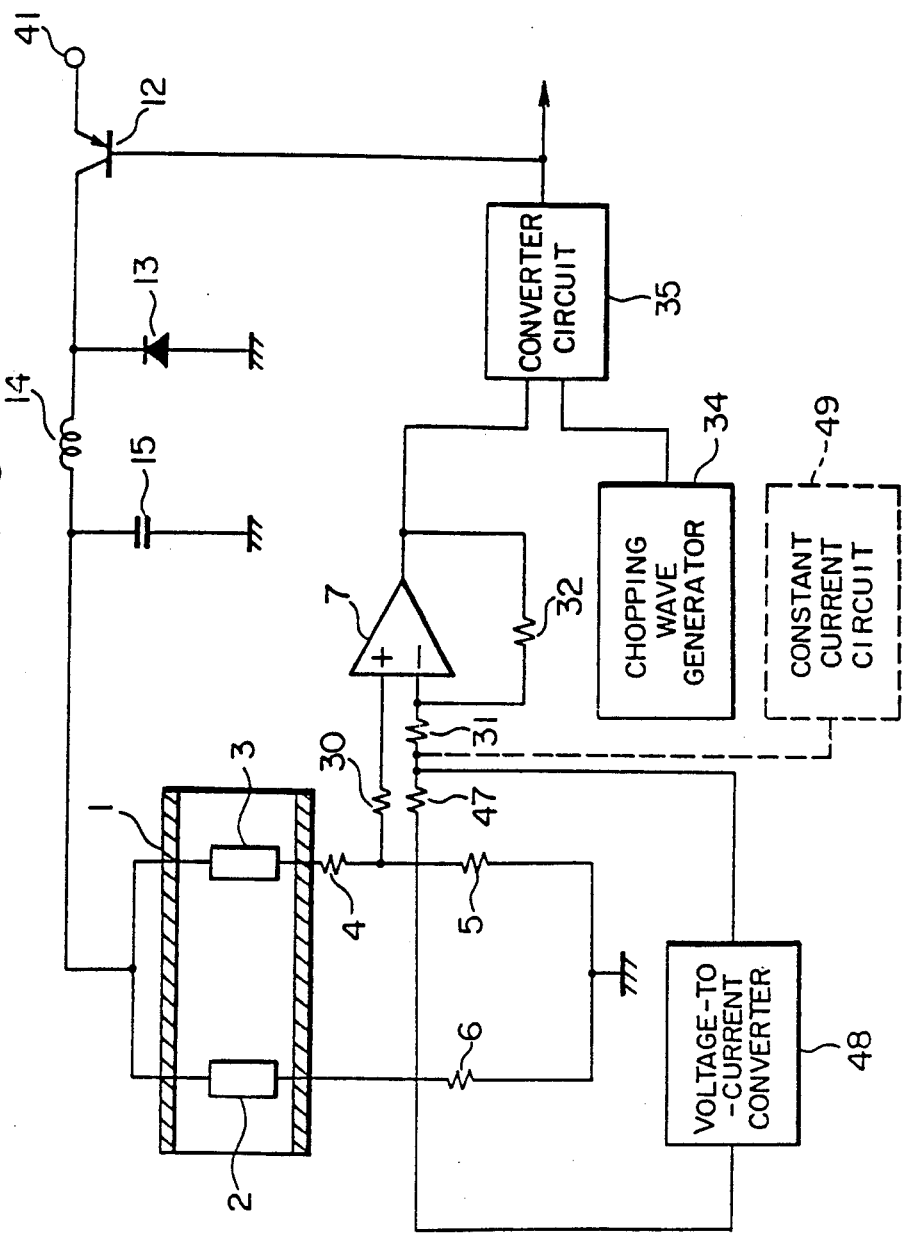
FIG. 6 schematically illustrates a circuit for use in a temperature sensing type flow sensor according to still another embodiment of the present invention.

Next, a circuit for use in a switch controlling type temperature sensing flow sensor according to still another embodiment of the present invention is schematically shown in FIG. 6. The flow sensor shown in FIG. 6 is provided with a voltage-to-current converter 48 for outputting a current which is arranged to be in proportion to the end-to-end voltage of the fixed resistor 6. The output from it is supplied between the resistors 31 and 47. The fixed resistors 6 and 47 are arranged to be considerably small with respect to the fixed resistors 31 and 32. The output current from the voltage-to-current converter 48 is arranged to be considerably small level with respect to that of the heating current which passes through the resistor 6, and is greater than the current which passes through the resistors 31 and 32. At this time, the output current from the voltage-to-current converter 48 is grounded via the resistors 47 and 6. Therefore, the D.C. gain of the differential amplifier circuit is determined by the resistance value of the fixed resistors 31 and 32, while the D.C. unbalance voltage is determined by the output current from the voltage-to-current converter 48 and the fixed resistance 47.

Figure 7A:
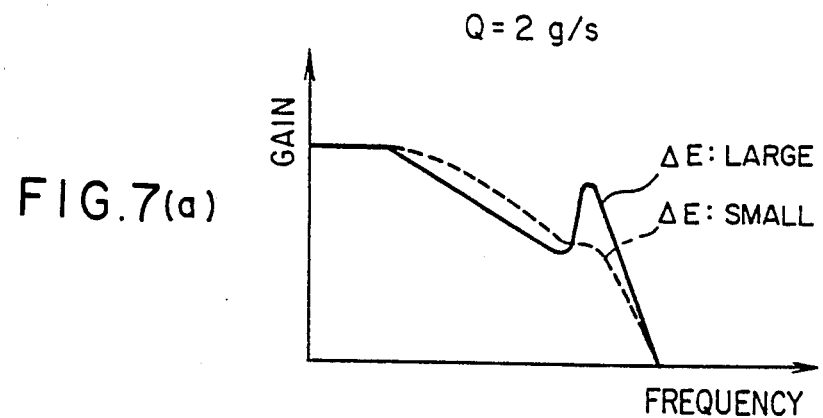
FIGS. 7A and 7B illustrate the frequency responsibility of the flow sensor shown in FIG. 6.
Figure 7B:
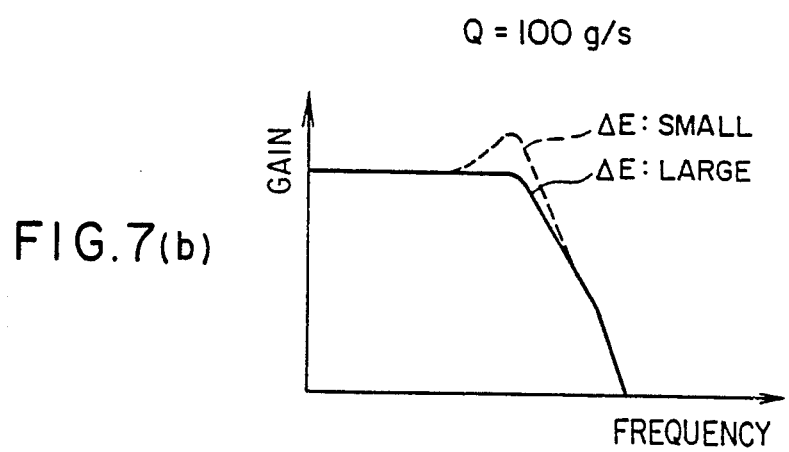

It is assumed that the voltage-to-current converter 48 is not provided. In this case, for example, a constant current circuit 49 is assumed to be provided. The differential amplifier circuit, which is composed of the differential amplifier 33, the resistors 30 to 32, and the resistor 47, amplifies the difference between the voltage of the D.C. unbalance power source formed by the constant current circuit 49 and the fixed resistor 47 and the output from the bridge circuit. The D.C. unbalance voltage is applied to adjust the AC characteristics of the sensor. FIG. 7 illustrates the frequency characteristics of the sensor when the differential gain is at the constant level, and illustrates the frequency characteristics of the output from the sensor with respect to a small flow change when the average flow Q is at the constant level {2 g/s in the case of FIG. 7(a), and 100 g/s in the case of FIG. 7(b)}. As can be clearly seen from this figure, the larger flow Q becomes, the narrower the frequency band becomes. In the case where the quantity of the flow is small as shown in FIG. 7(a), the peak of the flow appears in the vicinity of the resonant frequency of the smoothing circuit, and this peak becomes larger as the D.C. unbalance voltage $\Delta E$ becomes larger. On the other hand, in a case where average flow Q is large as shown in FIG. 7(b), more resonant characteristics appear as the D.C. unbalance voltage $\Delta E$ becomes smaller. Therefore, if $\Delta E$ is made smaller in order to prevent the system from becoming resonant in a small flow region, the system becomes resonant in the large flow region so that the maximum flow region capable of being measured is limited to substantially 50 g/sec. Consequently, it cannot cover, as the sensor, the overall flow region.

Therefore, as the flow becomes, larger the frequency response becomes excessively resonant. In addition, since the relationship between the D.C. unbalance voltage and the frequency characteristics is different depending upon whether the flow is large or small, the region which can be measured is narrowed.

To this end, the temperature sensing type flow sensor shown in FIG. 6 is provided with means for increasing the D.C. unbalance voltage to be applied to the differential amplifier circuit in proportion to increases in the intake air flow. As a result, the occurrence of resonance can be prevented in the overall flow region.

A case where the voltage-to-current converter 48 is provided as shown in FIG. 6 will be considered. As described above, the D.C. unbalance voltage is determined by an output current from the voltage-to-current converter 48 and the stationary resistor 47. Therefore, since the D.C. unbalance voltage is in proportion to the heating current, it becomes smaller in the small flow region, while the same becomes larger in proportion to the increase in the flow. Therefore, the peak shown in FIG. 7 can be prevented from being generated so that the most suitable frequency response can be obtained in the overall flow region.

In the above-described embodiment shown in FIG. 6, although the end-to-end voltage of the resistor 6 is selected as the input voltage to be supplied to the voltage-to-current converter 48, a voltage displaying a monotonically increasing characteristic, for example, the voltage at the junction between the temperature sensing elements 2 and 3, is able to produce a similar effect. Since the temperature sensing type flow sensor according to this embodiment is arranged in such a manner that the D.C. unbalance voltage which affects the frequency response of the sensor is arranged to be changed in accordance with the flow, a most suitable frequency responsiveness can be obtained throughout the flow region, and the flow region which can be measured is enlarged.

Figure 8:
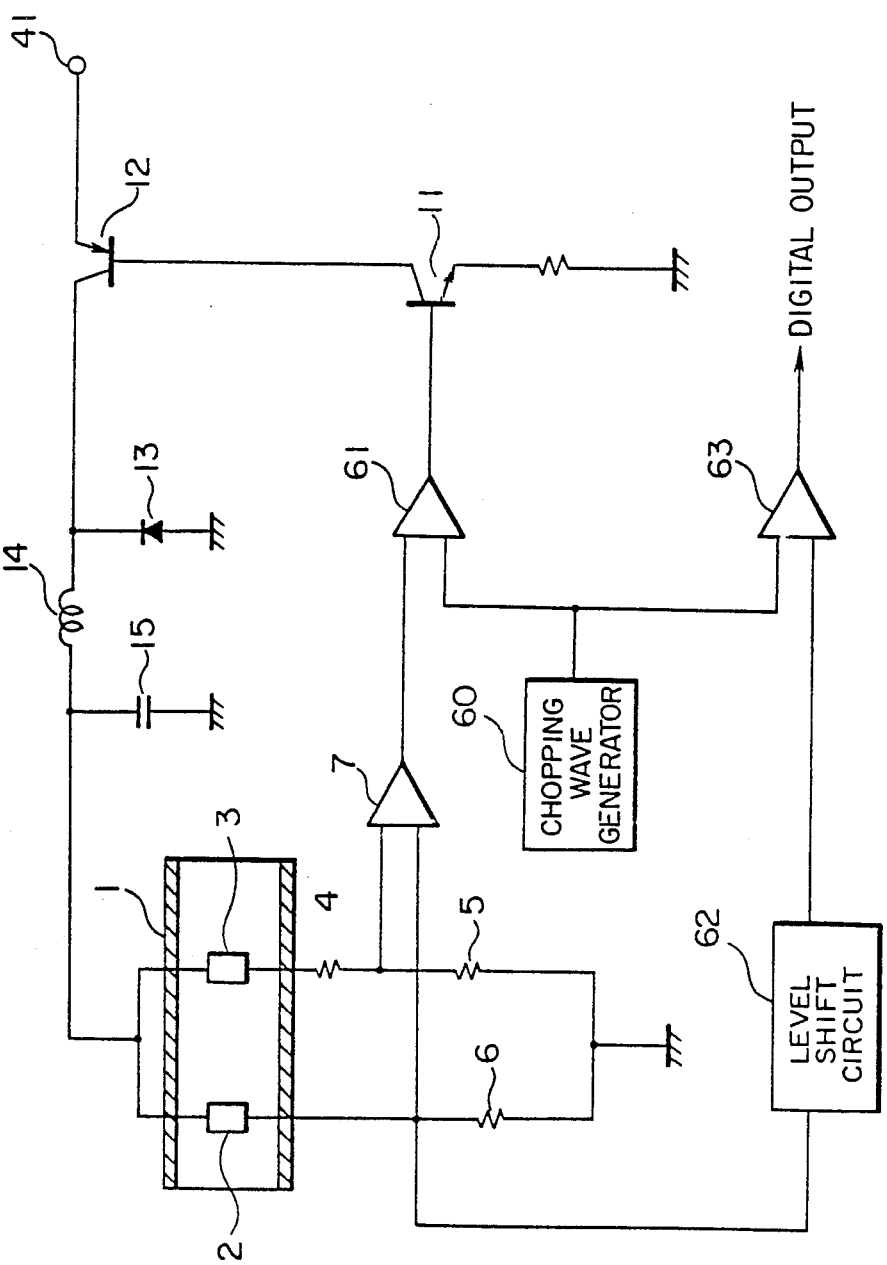
FIG. 8 schematically illustrating a circuit for use in a temperature sensing type flow sensor according to still another embodiment of the present invention.

Next, a circuit used for a switching control type temperature sensing type flow sensor according to still another embodiment of the present invention is schematically shown in FIG. 8. Similarly to the above-described embodiment, the Wheatstone bridge circuit is composed of the temperature sensing elements 2 and 3, and the fixed resistors 4 to 6, and the unbalance voltage of this bridge is amplified by inputting the voltages at the junction between the fixed resistor 6 and the temperature sensing element 2 and the junction between the fixed resistors 4 and 5 to the differential amplifier 7. A control pulse generating circuit is formed by the chopping wave generator 60 and a comparator 61. The output from the differential amplifier 7 is converted into a pulse signal having a time ratio in proportion to this output of this circuit. As a result, the switching transistor 12 is controlled to be switched on or off via the transistor 11. The current from the D.C. power source 41 is intermitted by the switching transistor 12, and then it is made continuous by a smoothing circuit and the diode 13, this smoothing circuit being constituted by the inductor 14 and the condenser 15, so that a current is supplied to the bridge circuit. The resistances are respectively determined in order to make the bridge balance when the temperature of the temperature sensing element 2 is higher than that of the intake air by a predetermined degree. In addition, with the feedback circuit composed as described above, a constant temperature circuit can be realized.

Next, an operation of the above-described switching control type temperature sensing type flow sensor will be described. Assuming that the air flow in the intake pipe 1 has been increased, the temperature of the temperature sensing element 2 for heating is lowered, and the resistance is reduced. In accordance with this fact, the potential at the junction between the temperature sensing element 2 and the fixed resistance 6 is lowered, while the output voltage from the differential amplifier 7 is increased. In addition, the time ratio of the digital output from the comparator 61 is changed, and the time in which the voltage is kept high is lengthened. The time at which the switching transistor 12 is switched on is lengthened via the transistor 11 used for controlling the base, and the heating current to be supplied to the bridge circuit via the smoothing circuit is increased, as a result of which the temperature of the temperature sensing element 2 for heating is prevented from being lowered. Consequently, the temperature of the temperature sensing element 2 for heating can be kept constant. The time ratio of the transistor 11 at this time becomes as follows:

$$D = \frac{T_{ON}}{T} \quad (11)$$

$$= \frac{I(R_h + R_6)}{V_i} \quad (12)$$

wherein $T_{ON}$ represents time in which the transistor 11 is switched on, T represents on-off cycle, I represents heating current, $V_i$ represents the voltage of the D.C. power source, $R_h$ represents resistance of the temperature sensing element 2 for heating, and $R_6$ represents resistance of the stationary resistor 6.

On the other hand, the relationship between the heating current I and air flow Q becomes as follows:

$$I^2 = A + B\sqrt{Q} \quad (13)$$

wherein A and B represent constants. Therefore, time ratio D becomes as follows:

$$D = \frac{(R_h + R_6) \cdot \sqrt{A + B\sqrt{Q}}}{V_i} \quad (14)$$

Since $R_h$ and $R_6$ are constants, time constant D is a function of Q provided that the power source voltage $V_i$ is not changed. Therefore, the flow Q can be obtained by measuring the time where the comparator pulse output is turned on and the time where the same is turned off. In addition, a benefit can be obtained that no interface with the microprocessor is needed since the output signal from the sensor, that is, the output from the comparator 61, is in digital form. The level shift circuit 62 is provided for the purpose of shifting the end-to-end voltage of the fixed resistor 6 so as to make the voltage closer to zero when the flow is zero. The thus-level shifted voltage is connected to the input of the comparator 63 together with the output from the chopping wave generator 60 at which the same is converted into a digital signal. Output $V_S$ from the level shift circuit 62 is given from equation (13) as follows:

$$V_S = R_6\sqrt{A + B\sqrt{Q}} - V_f \quad (15)$$

wherein $V_f$ represents a shift voltage. In this state, assuming that the minimum value of the chopping wave voltage from the chopping wave generator 60 is $V_1$, the maximum value of the same is $V_h$, one duty cycle of the output signal from the comparator 63 is T, and time period where the voltage is high is $T_h$, time ratio $D_S$ of the output signal form the comparator 63 becomes as follows:

$$D_S = \frac{T_h}{T} \quad (16)$$
$$= \frac{V_s - V_l}{V_h - V_l}$$

The output from the chopping wave generator 60 does not depend upon the power source voltage, and output $V_S$ from the level shift circuit 62 and the end-to-end voltage of the stationary resistor 6 relates to intake air flow Q, but does not relate to the power source voltage. Therefore, the time ratio $D_S$ of the digital output from the comparator 63 becomes a function of only the flow Q as shown in equation (16), and does not depend upon the power source voltage. Therefore, the flow Q in the intake pipe 1 can be obtained by measuring the digital output from the comparator 63.

It is assumed that the level shift circuit 62 and the comparator 63 are not provided. In this case, as can be clearly seen from equation (14), since the relationship between the time ratio D and flow Q is changed in accordance with the change of the power source voltage $V_i$, the change of the power source voltage $V_i$ appears as it is in the form of an error upon the flow. For example, when the power source voltage $V_i$ is changed by 1%, approximately 4% error in the measured flow occurs. In general, since the battery voltage of an automobile can vary between 8 V and 16 V, the power source voltage needs to be measured for the purpose of correcting the same. However, an analog-digital converter is needed to measure the power source voltage, causing for the merit obtained by employing the digital output to be lost.

On the other hand, when the level shift circuit 62 and the comparator 63 are both provided, the output representing the flow is obtained by converting the analog voltage which corresponds to the heating current into a digital signal as an alternative to using the output signal from the control pulse generating circuit which depends upon the power source voltage. Therefore, flows can be accurately measured without any affect from changes in the power source voltage. Therefore, it is not necessary to correct the power source voltage after detecting it. In addition, since the above-described effect can be obtained by additionally providing a simple circuit, costs can be reduced with respect to the case where the analog-digital converter is employed.

What is claimed is:

1. A temperature sensing type flow sensor comprising:
    temperature sensing elements disposed in intake air and having a resistance which changes with temperature;
    a bridge circuit composed of said temperature sensing elements and fixed resistors;
    a control pulse generating circuit for generating pulses having a time ratio which corresponds to the output from said bridge circuit;
    an intermittent control circuit disposed between an electric source and said bridge circuit and for controlling a time period in which current is conducted in accordance with said time ratio; and
    a smoothing circuit for making the noncontinuous output from said intermittent control circuit continuous as supplied to said bridge circuit.

2. A temperature sensing type flow sensor comprising:
    temperature sensing elements disposed in intake air and having a resistance which changes with temperature;
    a bridge circuit composed of said temperature sensing elements and fixed resistors;
    differential amplifier circuit for amplifying the output from said bridge circuit and including a compensation circuit for compensating a phase delay of said output;
    a control pulse generating circuit for generating pulses having a time ratio which corresponds to the output from said differential amplifier circuit;
    an intermittent control circuit disposed between an electric source and said bridge circuit and for controlling a time period in which current is conducted in accordance with said time ratio; and
    a smoothing circuit for making the noncontinuous output from said intermittent control circuit continuous as supplied to said bridge circuit.

3. A flow sensor according to claim 2 further comprising D.C. unbalance voltage generating means for generating a D.C. unbalance voltage which increases in proportion to an increase in the amount of intake air, said differential amplifier circuit amplifying a difference between the output from said bridge circuit and said D.C. unbalance voltage generated in said D.C. unbalance voltage generating means.

* * * * *